United States Patent [19]
Takeda et al.

[11] Patent Number: 5,829,666
[45] Date of Patent: Nov. 3, 1998

[54] MANUFACTURING METHOD OF TUBULAR BUMPER REINFORCEMENT MEMBER

[75] Inventors: Shinya Takeda, Toyota; Hirotake Nakao, Chiryu; Haruhiko Terada, Obu, all of Japan

[73] Assignee: Aisin Seiki Kabushiki Kaisha, Japan

[21] Appl. No.: 752,231

[22] Filed: Nov. 19, 1996

[30] Foreign Application Priority Data

Nov. 20, 1995 [JP] Japan ................................ 7-301789

[51] Int. Cl.⁶ .................... B21C 37/08; B23K 13/02; B23K 26/00; B23K 101/06
[52] U.S. Cl. .................. 228/147; 228/173.7; 228/175; 219/612; 219/121.64
[58] Field of Search ................... 228/146, 147, 228/158, 175, 173.4, 173.7, 13; 72/52, 166, 168; 293/120–122, 155; 219/611, 612, 633, 121.64

[56] References Cited

U.S. PATENT DOCUMENTS

| | | | |
|---|---|---|---|
| 5,092,512 | 3/1992 | Sturrus et al. | 228/146 |
| 5,163,225 | 11/1992 | Goleby | 228/173.4 |
| 5,306,058 | 4/1994 | Sturrus et al. | 2293/154 |
| 5,554,837 | 9/1996 | Goodwater et al. | 219/121.64 |

FOREIGN PATENT DOCUMENTS

0449599 A1  3/1991  European Pat. Off. .
7-246894  9/1995  Japan .

*Primary Examiner*—Samuel M. Heinrich
*Attorney, Agent, or Firm*—Finnegan, Henderson, Farabow, Garrett & Dunner, L.L.P.

[57] ABSTRACT

A method for manufacturing a sweeped tubular bumper reinforcement member having a rear wall formed with an inwardly indented portion in cross-section and a front wall formed in parallel with the rear wall and welded to the inwardly indented portion of the rear wall.

3 Claims, 6 Drawing Sheets

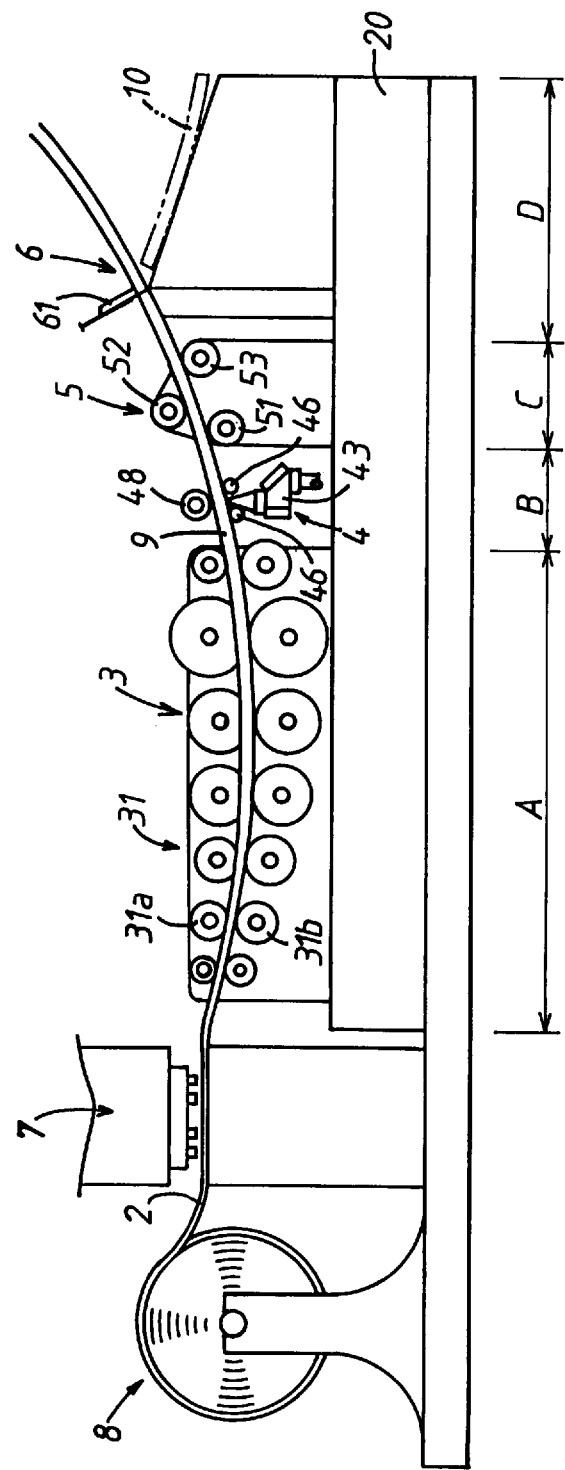

MANUFACTURING METHOD OF TUBULAR BUMPER REINFORCEMENT MEMBER

BACKGROUND OF THE INVENTION

1. Field of the Invention

The present invention relates to a method for manufacturing a roll-formed tubular bumper reinforcement member for use in automotive vehicles, and more particularly to a method of manufacturing a sweeped tubular bumper reinforcement member having a rear wall formed with an inwardly indented portion in cross-section and a front wall formed in parallel with the rear wall and welded to the inwardly indented portion of the rear wall.

2. Description of the Prior Art

In U.S. Pat. No. 5,092,512 issued on Mar. 3, 1992, there has been proposed a sweeped tubular bumper bar which is constructed of a sheet of high tensil strength steel roll-formed to cause its side edges to abut one another. In the manufacturing process of the bumper bar, the side edges of the sheet steel are induction welded downstream of the roll-forming process to form an integral tube member, and the integral tube member is curved or sweeped by a sweep-forming process downstream of the welding process to produce the bumper bar in a series of continuous processes.

Assuming that the manufacturing method was adapted to produce a sweeped tubular bumper reinforcement member having a rear wall formed with an inwardly indented portion in cross-section and a front wall formed in parallel with the rear wall and welded to the inwardly indented portion of the rear wall, it would be required to additionally apply a welding material for complete weld of the abutted side edges during the welding process. This requires a pre-process for application of the welding material and a process for removing burrs from the welded portion after the welding process, resulting in an increase of the manufacturing cost.

SUMMARY OF THE INVENTION

It is, therefore, a primary object of the present invention to provide a manufacturing method of the tubular bumper reinforcement member capable of welding the abutted side edges of the sheet steel in a simple manner.

According to the present invention, the object is attained by providing a method for manufacturing a sweeped tubular bumper reinforcement member having a rear wall formed with an inwardly indented portion in cross-section and a front wall formed in parallel with the rear wall and welded to the inwardly indented portion of the rear wall, comprising the steps of roll-forming a high tensile strength sheet metal strip to form a closed tubular member in such a manner that an upper wall of the tubular member is formed with a downwardly indented portion in cross-section and that longitudinal side edges of the sheet metal strip are abutted to one another to form a bottom wall of the tubular member and opposed to the bottom surface of the downwardly indented portion, welding the side edges of the sheet metal strip each other together with the bottom surface of the downwardly indented portion from an underside of the tubular member, sweeping the tubular member upwardly at a predetermined curvature after the welding of the side edges has been completed and cutting the swept tubular member at a predetermined length in succession to provide a series of the sweeped tubular bumper reinforcement members.

According to an aspect of the present invention, there is provided a method for manufacturing a sweeped tubular bumper reinforcement member having a rear wall formed with an inwardly indented portion in cross-section and a front wall formed in parallel with the rear wall and welded to the inwardly indented portion of the rear wall, comprising the steps of roll-forming a high tensile strength sheet metal strip to form a closed tubular member in such a manner that an upper wall of the tubular member is formed with a downwardly indented portion in cross-section and that longitudinal side edges of the sheet metal strip are abutted to one another to form a bottom wall of the tubular member and opposed to the bottom surface of the downwardly indented portion and sweeping the tubular member upwardly at a predetermined curvature during the roll-forming process, welding the side edges of the sheet metal strip each other together with the bottom surface of the downwardly indented portion from an underside of the swept tubular member and cutting the swept tubular member at a predetermined length in succession after the welding of the side edges has been completed to provide a series of the sweeped tubular bumper reinforcement members.

BRIEF DESCRIPTION OF THE DRAWINGS

Other objects, features and advantages of the present invention will be more readily appreciated from the following detailed description of a preferred embodiment thereof when taken together the accompanying drawings, in which:

FIG. 2 is a schematic illustration of the manufacturing process of the bumper reinforcement member shown in FIG. 1;

DESCRIPTION OF THE PREFERRED EMBODIMENT

Figure 1:
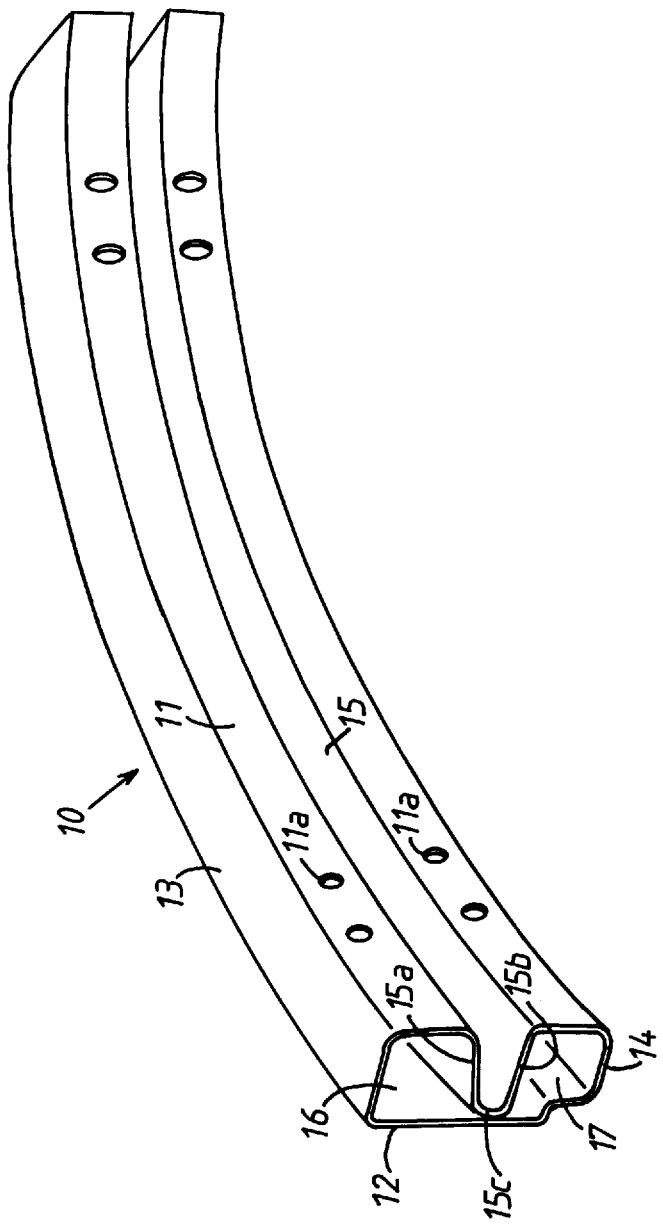
FIG. 1 is a perspective view of a sweeped tubular bumper reinforcement member produced by a manufacturing method of the present invention.

Illustrated in FIG. 1 is a sweeped tubular bumper reinforcement member 10 adapted for use in automotive vehicles, which reinforcement member 10 is roll-formed with a rear wall 11, a front wall 12 in parallel with the rear wall 11 and top and bottom walls 13 and 14 connecting the rear wall 11 with the front wall 12. The bumper reinforcement member 10 is mounted on a vehicle body structure (not shown) to be applied with an impact at its front wall 12 in the occurrence of a collision. The rear wall 11 is inwardly indented at its central portion 15 to form a pair of longitudinal reinforcement walls 15a and 15b subdividing the interior of the bumper reinforcement member 10 into a pair of closed cavities 16 and 17. The reinforcement bumper member 10 is curved or sweeped at a predetermined curvature during a roll-forming process to have a contour consistent with the front profile of the vehicle body. The reinforcement bumper member 10 is constructed of a sheet of high tensile strength steel 2 roll-formed to cause its side edges to abut one another.

As shown in FIG. 2, the manufacturing process of the bumper reinforcement member 10 consists of a first roll-forming process A, a laser welding process B, a second roll-forming process C and a cutting process D. The first roll-forming process A is carried out by means of a roll-forming machine 3 provided with a series of plural roller units 31 each of which is composed of a pair of rollers 31a and 31b. The laser welding process B is carried out by means of a laser welding machine 4 placed downstream of the roll-forming machine 3. The second roll-forming process C is carried out by means of a three-point roll-bending machine 5 located downstream of the laser beam welding machine 4. The roll-bending machine 5 is provided with three rollers 51, 52 and 53. The cutting process D is carried out by means of a cutting machine 6 located downstream of the roll-bending machine 5. The cutting machine 6 is provided with a cutter 61. Arranged upstream of the roll-forming machine 3 are a perforator 7 provided to form mounting holes 11a in the sheet of high tensile strength steel for attachment of the bumper reinforcement member 10 to the vehicle body structure and a steel roll holder 8 provided to rotatably support a flat steel strip 2 wound around a steel roll.

Figure 3A:
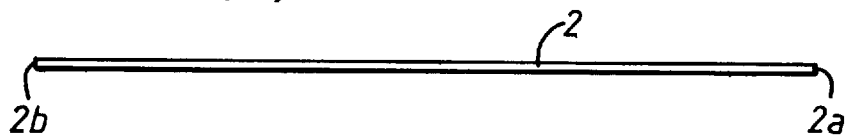
FIGS. 3(a)–3(d) illustrates a process for roll-forming a sheet of high tensile strength steel.
Figure 3B:
Figure 3C:
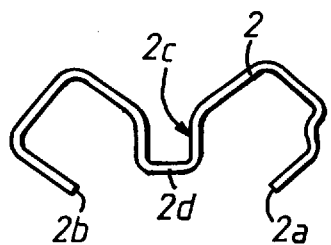
Figure 3D:
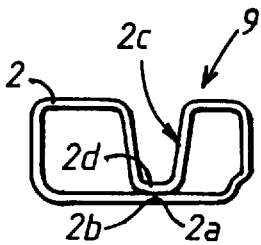

When the steel strip 2 is payed off from the steel roll and supplied into the roll-forming machine 3 through the perforator 7, the steel strip 2 is progressively formed by the roller units 31 to the shape as shown in FIGS. 3(a) to 3(d). In this instance, the steel strip 2 is gradually roll-formed by the roller units 31 to cause its longitudinal side edges 2a, 2b to abut one another and is curved or sweeped by the series of roller units 31 upwardly displaced in sequence to form an upwardly sweeped tubular member 9 with the side edges 2a, 2b of the steel strip 2 abutting each other as shown in FIG. 3(d). During the roll-forming process, the upwardly sweeped tubular member 9 is roll-formed with a downwardly indented portion 2c in cross-section in a condition where the abutted side edges 2a, 2b of steel strip 2 are opposed to the bottom surface 2d of the downwardly indented portion 2c. Thereafter, the tubular member 9 is supplied into the laser welding machine 4 where the abutted side edges 2a, 2b are induction welded to each other together with the bottom surface 15c of downwardly indented portion 2c to form the tubular member 9 in the form of an integral tube. The tubular member 9 thus welded passes through the three-point roll-bending machine 5 where the tubular member 9 is further curved or sweeped upwardly by means of the rollers 51, 53 and 52 along its longitudinal direction. At the end of the manufacturing process, the tubular member 9 is supplied into the cutting machine 6 where the tubular member 9 is cut off at a predetermined length in succession by means of the cutter 61 to produce the tubular bumper reinforcement member 10 shown in FIG. 1.

Figure 4:
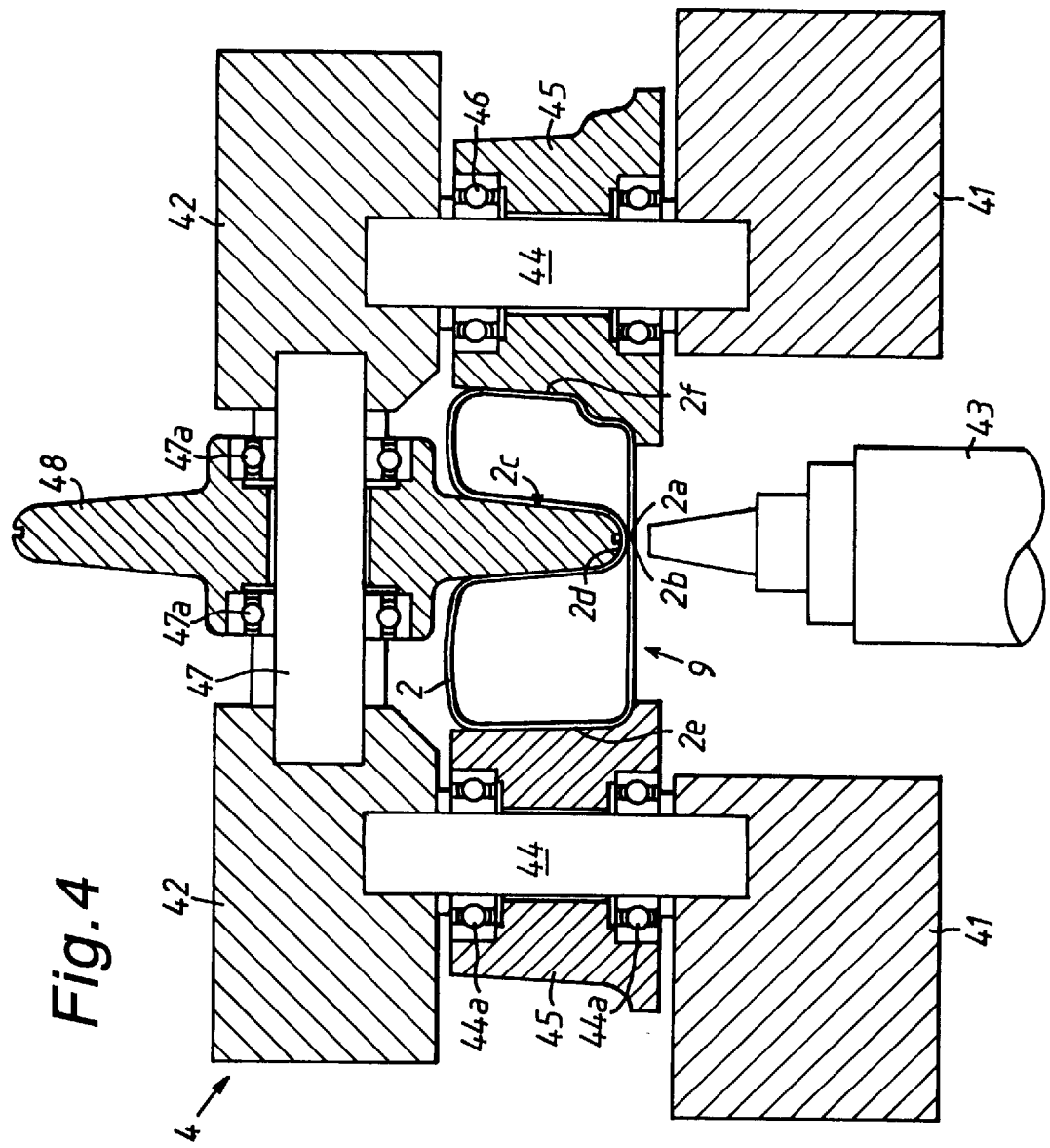
FIG. 4 is a vertical sectional view of a laser welding machine used in the manufacturing process shown in FIG. 2.
Figure 5:
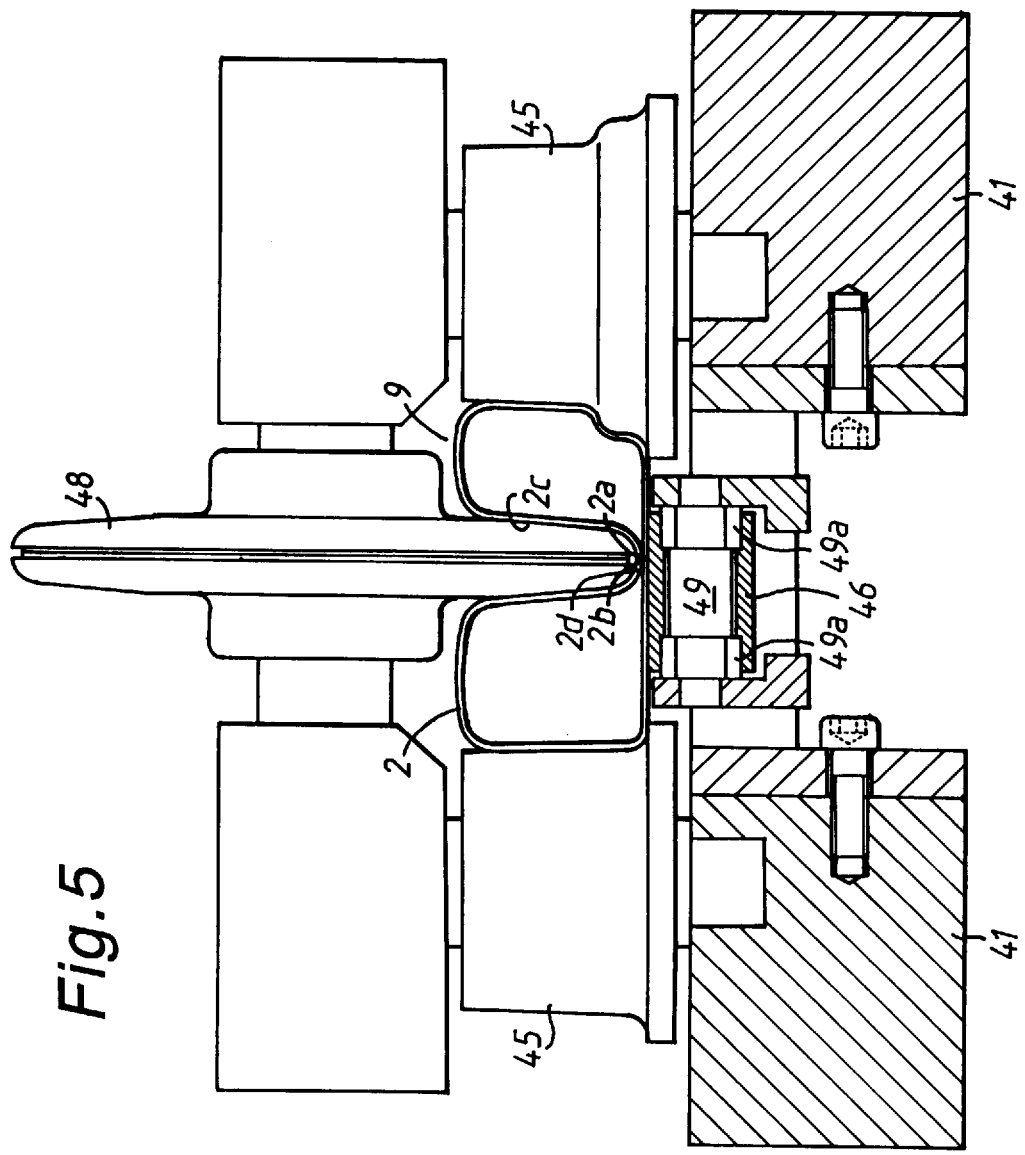
FIG. 5 is a front view of the laser welding machine illustrated partly in cross-section.

As shown in FIGS. 2, 4 and 5, the induction welding machine 4 is provided with a pair of spaced lower support blocks 41 mounted on a support bed 20 of the roll-forming machine 1 and the three-point roll-bending machine 5, a pair of spaced upper support blocks 42 and a welding nozzle 43. The upper support blocks 42 are mounted on the lower support blocks 41 by means of a pair of laterally spaced vertical support shafts 44, and a pair of side rollers 45 are rotatively carried by the support shafts 44 respectively through a pair of axially spaced ball bearings 44a. The side rollers 45 are arranged to be brought into contact with the side walls 2e and 2f of the tubular member 9 such that the tubular member 9 is retained by the side rollers 45 in position when it has been supplied into the laser welding machine 7 as shown in FIGS. 4 and 5. The upper support blocks 42 are connected to each other by means of a lateral support shaft 47, and an upper roller 48 is rotatively carried by the lateral support shaft 47 through a pair of axially spaced roller bearings 47a.

Figure 6:
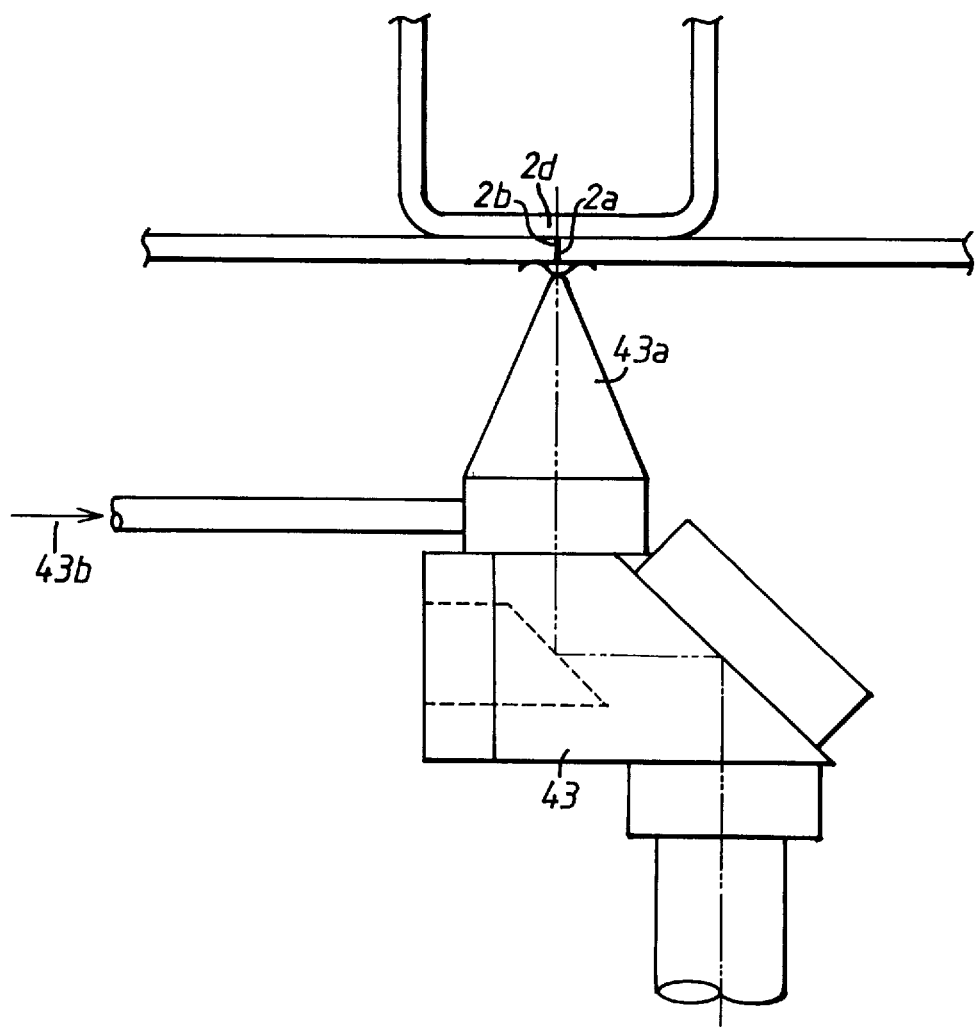
FIG. 6 is an enlarged view illustrating a welding process effected by the welding machine.

The upper roller 48 is arranged to be brought into engagement with the downwardly indented portion 2c of the tubular member 9 and cooperates with the side rollers 45 to retain the tubular member 9 in position during the welding process. The welding nozzle 43 is located between the lower support blocks 41 to apply a laser beam 43a and process gas 43b toward the bottom of the tubular member supplied into the welding machine 4 as shown in FIG. 6. Thus, the abutted side edges 2a, 2b of the steel strip 2 are induction welded to each other together with the bottom surface 2d of the downwardly indented portion 2c when applied with the laser beam 43a. Since in this embodiment, the tubular member 9 is welded at the bottom side, the pressure of process gas 43b can be increased to blow spatters and weld sagging away from the weld portion.

As shown in FIGS. 1 and 6, rollers 46 are further provided between the lower support blocks 41 respectively upstream and downstream of the welding nozzle 43. The rollers 46 each are rotatively supported by a lateral support shaft 49 through a pair of axially spaced bearings 49a. The rollers 46 each are placed to be brought into contact with the abutted side edges 2a, 2b of the steel strip 2 and operates with the rollers 45 and 48 to retain the tubular member 9 in position during the welding process. Thus, the tubular member 9 is reliably retained by the rollers 45, 46 and 48 during the welding process to eliminate thermal deformation thereof.

Although in the above embodiment, the tubular member 9 has been curved or sweeped by the roll-forming machine 3 during the first roll-forming process A, the tubular member 9 may be curved or sweeped only by the three-point roll-bending machine 5 during the second roll-forming process C or only by the roll-forming machine 3 during the first roll-forming process A.

As is understood from the above description, the manufacturing method of the present invention is characterized by the welding process during which the abutted side edges 2a, 2b of the steel strip 2 are induction welded to each other together with the downwardly indented portion 2c at the bottom of the tubular member 9.

What is claimed is:

1. A method for manufacturing a sweeped tubular bumper reinforcement member having a rear wall formed with an inwardly indented portion in cross-section and a front wall formed in parallel with the rear wall and welded to the inwardly indented portion of the rear wall, comprising the steps of:

roll-forming a high tensile strength sheet metal strip to form a closed tubular member in such a manner that an upper wall of the tubular member is formed with a downwardly indented portion in cross-section and that longitudinal side edges of the sheet metal strip are abutted to one another to form a bottom wall of the tubular member and opposed to the bottom surface of the downwardly indented portion;

welding the side edges of the sheet metal strip each other together with the bottom surface of the downwardly indented portion from an underside of the tubular member;

sweeping the tubular member upwardly at a predetermined curvature after the welding of the side edges has been completed; and cutting the swept tubular member at a predetermined length in succession to provide a series of the sweeped tubular bumper reinforcement members.

2. A method for manufacturing a sweeped tubular bumper reinforcement member having a rear wall formed with an inwardly indented portion in cross-section and a front wall formed in parallel with the rear wall and welded to the inwardly indented portion of the rear wall, comprising the steps of:

roll-forming a high tensil strength sheet metal strip to form a closed tubular member in such a manner that an upper wall of the tubular member is formed with a downwardly indented portion in cross-section and that longitudinal side edges of the sheet metal strip are abutted to one another to form a bottom wall of the tubular member and opposed to the bottom surface of the downwardly indented portion and sweeping the tubular member upwardly at a predetermined curvature during the roll-forming process;

welding the side edges of the sheet metal strip each other together with the bottom surface of the downwardly indented portion from an underside of the swept tubular member; and cutting the swept tubular member at a predetermined length in succession after the welding of the side edges has been completed to provide a series of the sweeped tubular pumper reinforcement members.

3. The method of claim 1, wherein an apparatus for welding the side edges of the sheet metal comprises a pair of laterally spaced side rollers arranged to be brought into contact with side walls of the tubular member, an upper roller arranged to be brought into engagement with the downwardly indented portion of the tubular member and to cooperate with said side rollers to retain the tubular member in position, and a welding nozzle placed between said side rollers to apply a laser beam to the side edges of the sheet metal strip from the underside of the tubular member.

* * * * *